(12) United States Patent
Rappsilber

(10) Patent No.: US 12,418,575 B2
(45) Date of Patent: Sep. 16, 2025

(54) COMMUNICATIONS SYSTEM AND METHOD FOR COMMUNICATING BETWEEN AT LEAST TWO LOCATIONS

(71) Applicant: Patrick Rappsilber, Munich (DE)

(72) Inventor: Patrick Rappsilber, Munich (DE)

( * ) Notice: Subject to any disclaimer, the term of this patent is extended or adjusted under 35 U.S.C. 154(b) by 32 days.

(21) Appl. No.: 18/561,013

(22) PCT Filed: May 17, 2022

(86) PCT No.: PCT/EP2022/063343
§ 371 (c)(1),
(2) Date: Nov. 15, 2023

(87) PCT Pub. No.: WO2022/243328
PCT Pub. Date: Nov. 24, 2022

(65) Prior Publication Data
US 2024/0422206 A1 Dec. 19, 2024

(30) Foreign Application Priority Data
May 18, 2021 (DE) ...................... 10 2021 002 601.2

(51) Int. Cl.
*G06F 15/173* (2006.01)
*H04L 65/61* (2022.01)
*H04L 65/75* (2022.01)

(52) U.S. Cl.
CPC ............ *H04L 65/61* (2022.05); *H04L 65/762* (2022.05)

(58) Field of Classification Search
CPC ............................. H04L 65/61; H04L 65/762
(Continued)

(56) References Cited

U.S. PATENT DOCUMENTS 10,666,941 B1 * 5/2020 Doron .............. H04N 21/21805
2014/0104378 A1 4/2014 Kauff
(Continued)

FOREIGN PATENT DOCUMENTS

EP 2434772 A1 3/2012

OTHER PUBLICATIONS

International Search Report Dated Sep. 9, 2022 In Application PCT/EP2022/063343, 2 Pages.
(Continued)

*Primary Examiner* — Alan S Chou
(74) *Attorney, Agent, or Firm* — LUCAS & MERCANTI, LLP; Klaus P. Stoffel

(57) ABSTRACT

A communications system, including an image recording device which records images at a first location and generates image data therefrom, a data transmission device which transmits the data from the first location to a second location remote from the first location via a transmission path, a first receiver device that receives the transmitted image data at the second location, with the transmission path being selected from a plurality of selectable transmission paths and the image data available at the second location being overall image data which are transmitted to the second location in real-time, which are composed in synchronized fashion by an image synthesis device from at least two individual image data generated at the same time by in each case one of at least two cameras of the image recording device and which represent the image of a solid angle range spanned by a horizontal angle range, related to the direction of gravity, of at least $7\pi/6$ and a vertical angle range, including the horizontal in particular, of at least $\pi/3$, the solid angle range relating to a common center of the at least two cameras generating the individual image data, with the radially
(Continued)

outermost lens of the respective camera being no more than 40 cm away from the common center.

16 Claims, 4 Drawing Sheets

(58) Field of Classification Search
USPC .................................................. 709/224
See application file for complete search history.

(56) References Cited

U.S. PATENT DOCUMENTS

| | | | |
|---|---|---|---|
| 2015/0346832 A1* | 12/2015 | Cole | H04N 13/243 |
| | | | 345/156 |
| 2017/0289219 A1 | 10/2017 | Khalid | |
| 2017/0289221 A1* | 10/2017 | Khalid | H04L 65/764 |
| 2017/0316607 A1* | 11/2017 | Khalid | G02B 27/017 |
| 2017/0339391 A1* | 11/2017 | Zhou | H04L 65/613 |
| 2019/0104326 A1* | 4/2019 | Stockhammer | H04N 21/6377 |
| 2020/0007905 A1 | 1/2020 | Han | |
| 2020/0043133 A1 | 2/2020 | Boyce | |
| 2020/0275134 A1 | 8/2020 | Bang | |
| 2021/0037168 A1* | 2/2021 | Mathur | H04L 65/61 |

OTHER PUBLICATIONS

Dixon, I.: Acer Holo 360 Camera Review (with video), TheDigital-Lifestyle.com, Aug. 24, 2018, S.1-6.

Grünheit, C., et al: Efficient representation and interactive streaming of high-resolution panoramic views. In: Proc. Int. Conf. on Image Processing, 2002, vol. 3, S. 209-212.

Notification of English Transmittal of Translation of the International Preliminary Report on Patentability Dated Nov. 21, 2023, 9 Pages.

* cited by examiner

COMMUNICATIONS SYSTEM AND METHOD FOR COMMUNICATING BETWEEN AT LEAST TWO LOCATIONS

CROSS-REFERENCE TO RELATED APPLICATIONS

The present application is a 371 of International application PCT/EP2022/063343, filed May 17, 2022, which claims priority of DE 10 2021 002 601.2 filed May 18, 2021, the priority of these applications is hereby claimed and the applications are incorporated herein by reference.

BACKGROUND OF THE INVENTION

The invention relates to a communications system and also augments safety systems and learning and/or training systems. In particular, the invention relates to a communications system, comprising an image recording apparatus recording images at a first location and generating image data therefrom, a data transmission apparatus transmitting the generated image data from the first location via a transmission path to a second location remote from the first location, a first receiver apparatus receiving the transmitted image data at the second location, and in particular a second receiver apparatus provided at the first location to receive a feedback signal.

It is self-evident that such communications systems are well known, and they serve for communication between two locations including at least one piece of image information that represents an image in the surroundings of the first location, the said image being intended to be broadcast to the second location, for example on an electronic visual display.

A typical example of such a communications system is television, for example a live transmission of a sports event. In this case, images of the arena interior are recorded at the first location, for example a sports arena, using at least one camera, usually using a plurality of cameras with different viewing angles, and are broadcast, not only to the television sets in the individual households, but also to the television studio. At the location of the live transmission, for instance the sports arena, it is moreover possible to send responses to the first location, for instance in the form of queries, for instance questions answered for example by a commentator in situ. Numerous comparable and similar communications systems are well known.

Thus, such communications systems may for example also be used when dealing with hazardous situations, within the scope of which image recordings are transmitted from the location of the hazard to a command center, and emergency personnel at the location of the hazard are instructed from said command center.

However, from dealing with such hazardous situations, for example, it has become apparent that optimal results are not always achieved, not least due to insufficient communication.

SUMMARY OF THE INVENTION

The object of the invention is that of improving a communications system of the type set forth at the outset in view of a sensible compromise between reliability, information content, and transmission times.

The invention achieves this object by way of a communications system of the type set forth at the outset, which is essentially characterized in that the at least one transmission path is a transmission path selected from a plurality of selectable transmission paths and the image data present at the second location are overall image data, which are transmitted to the second location in real time, stitched in synchronized fashion by an image synthesis apparatus from at least two frame data generated at the same time by in each case one of at least two cameras of the image recording apparatus, and represent the image of a solid angle region ($\Omega_g$) spanned with respect to a common center of the at least two cameras that generate the frame data by a horizontal angle range ($\Delta\varphi$), related to the direction of gravity, of at least $7\pi/6$ and a vertical angle range ($\Delta\vartheta$), comprising the horizontal ($\pi/2$) in particular, of at least $\pi/3$, with the radially outermost lens of the respective camera having a distance from the common center of no more than 40 cm.

For example, it turns out that incorrect instructions and misunderstandings in the communication, for example, are at least in part traced back to the fact that the second location (e.g., the command center) is provided with a different viewing angle, or not provided with the overall impression of the happenings at the location of the hazard, in comparison with the experiences of the emergency personnel in situ. This also applies to the conventional use of a plurality of cameras.

However, with the design according to the invention, at least two cameras have a common center and therefore reproduce the situation at the deployment location more realistically, and moreover reproduce a larger area, especially situation-dependent essential areas of the solid angle region that covers the entire space. The overall image data are available as spatial image data at the second location by virtue of the fact that the overall image data cover this relatively large solid angle region, which an individual camera is unable to provide, and moreover in particular do not require stitching only at the second location from transmitted frame data, provided that the stitching of the overall image data from the frame data by the image synthesis apparatus preferably still occurs prior to the transmission itself, but nevertheless in real time. In this sense, it is not only an image that is transmitted, but rather it is the solid angle region as seen from a center as a starting point, in particular the entire space or the space of individually transmitted data, that is spatially stitched at the second location. Within the space formed by the covered solid angle region, it is possible both to navigate in a portion and to display the entire covered solid angle region at the second location. Moreover, the radially outermost lens of the respective camera has a distance of no more than 40 cm from the common center (of the respective fields of view of the cameras of the image recording apparatus). This yields an advantageous compromise between image quality, physical optics, and short creation time for the generation of the overall space image (digital space).

The synthesis could be implemented at the second location or at least partly implemented at the second location; however, it is particularly preferably implemented, in particular in full, at the first location. To this end, the image synthesis apparatus may be connected to the image recording apparatus via an internal network, in particular with Gbit capability. Since the entire image of the recorded solid angle region, as captured by the image record and synthesized, should preferably be displayed simultaneously (apart from the small omissions, specified below, at the edge of the two-dimensional display), it is preferable for no portion to be prioritized for the transmission (unlike in the case of conventional panorama transmission techniques with a higher priority for a "field of view" or "view of interest" of the end user equipped with VR goggles and another lowpriority transmission path in angle regions which are "out of interest"); instead, the image data imaging the entire recorded solid angle region are transferred as a joint packet of the same priority as a uniform transmission data stream and, on the transmission side, are transferred to the receiver as such a uniform data stream of the transmission (independently of a transmission optionally implemented as packaged into individual data packets for transmission-technical reasons).

In this context, it is preferable for the horizontal angle range of the solid angle region to also comprise at least $4\pi/3$, preferably $3\pi/2$, in particular at least $7\pi/4$, or else the entire horizontal angle range of $2\pi$.

At the first location, the position of the image transmission device, as a mobile device, can change between different points at the first location during ongoing operation.

With regard to the vertical angle range of at least $\pi/3$, provision is preferably made for the latter to be at least $\pi/2$, in particular at least $2\pi/3$, wherein the entire vertical angle range of $\pi$ may also be considered here. In this case, the entire solid angle range $\Omega$ of $4\pi$ would be encompassed in the case of a combination with a horizontal angle range of $2\pi$.

The transmission system according to the invention is moreover more reliable and also more outage resistant since it need not be based on a single transmission path; instead, it can select the more suitable transmission path from a plurality of at least two selectable transmission paths. In this case, a plurality of transmission paths can also be used in parallel.

In this context, provision is preferably made for the plurality of selectable transmission paths to comprise at least two from the following group: LTE, SAT, WLAN, LAN, and landline, among these preferably at least LTE and/or SAT, preferably at least LTE and SAT.

In this context, provision is also preferably made for a selection device which makes the selection to make the selection according to one or more specified criteria, with a specified criterion consisting of at least one of currently achievable transmission rate and transmission time, and to preferably check both criteria. In a further preferred design, ensuring a minimum transmission rate within a still acceptable transmission time takes priority over a minimized transmission time when making the selection. The image data are preferably transmitted continuously in time (one mode of operation); however, sequences of images recorded spaced apart in time in another mode of operation are also considered, in particular with a changeably adjustable time interval between two recordings. Preferably, the one or the other mode of operation is set automatically in particular, on the basis of the available bandwidth of the selected transmission path (or paths).

It is preferable in this context for the transmission rate of the overall image data to be at least 5 Mbit/s, preferably at least 10 Mbit/s, further preferably at least 20 Mbit/s, even at least 30 Mbit/s, and in particular even 40 Mbit/s. Then again, transmissions of the overall image data with a transmission rate of less than 20 Mbit/s, even less than 10 Mbit/s are also thought of by all means, in order to realize greater outage resistance despite a desired minimum transmission rate of at least 5 Mbit/s, for example. In this respect, a further mode of operation may see a targeted reduction in the data transmission of data available, by their nature, in a manner that fills up a higher transmission rate.

In this context, it is likewise preferable for the image synthesis device to implement a compression of the image data density (amount of image data per solid angle element), in any case in yet a further mode of operation on the basis of the information signaled as achievable transmission rate by the data transmission apparatus. In respect of the compression methods, current standards H265/H264 are considered, but also H266 currently in development and/or the successors thereof.

For as long as a sufficient data transmission rate is available in particular, it is preferable for the transmitted image data to have a resolution that allows the display thereof on an electronic visual display at the second location with at least 4 k, preferably at least 6 k, in particular at least 8 k or higher, in particular even 10 k or higher or 12 k or higher. Provision is made for a control/selection of the resolution also to be implemented on the basis of the achievable transmission rate, at least in one selectable mode of operation.

Within the scope of the invention, the expression "real time" should be understood as meaning oriented to what is technically conventional with regard to live transmissions or at least pre-live transmissions; by all means, this may include time delays of a few seconds (live) or time windows of up to one hour (pre-live). In this context, provision is made for the image synthesis device to require a time of less than 3 seconds, preferably less than 2.5 seconds, and in particular less than 2 seconds to stitch the overall image data. It is understood that even shorter times, such as less than 1.5 seconds and down to less than 1 second, are also preferred, in each case for live applications. For pre-live applications, provision is also made for processing times of the image synthesis to stray into the minute range, in particular in order to achieve a higher image quality, but for these times to be preferably less than 40 min, in particular less than 20 min.

In a preferred embodiment, the image is displayed at the second location, for instance by way of the display apparatus described hereinafter, within 45 minutes after said image was recorded at the first location, further preferably within 30 minutes. Further preferably, the image is displayed no later than 10 minutes, further preferably no later than 5 minutes after said image was recorded; however, provision is also made for the image to be displayed at the second location by way of the display apparatus within only seconds after the image was recorded at the first location, preferably within 10 seconds, further preferably within 5 seconds, even within 4, 3 or only 2 seconds or less. In the case of relatively long intermediate times, time windows can be used to augment the images with supplementary image and/or text information.

By way of a receiver device preferably provided at the first location, it is also possible for feedback to reach the first location; this feedback may already represent a response to the spatial image data, for example to a part thereof in any case.

Techniques that can be used for stitching the overall image data from the frame data comprise for example open source programs which stitch overall images from 2-8 individual camera image data, for example, preferably using high-end technology with regards to graphics and processor technology (e.g., Intel Core) and internal Gbit network connections. Use can also be made of multi-camera systems with configurable data output options. These are preferably controlled on the basis of the available bandwidth.

At least one display apparatus on which the overall image or a part thereof is displayable is preferably provided at the second location. In a particularly preferred design, provision is made for a spatial display, also in the form of a large electronic visual display, with preferably a spatial display area and a vertical extent of preferably more than 1.20 m, in particular than 1.60 m, and/or a horizontal extent of preferably at least 2 m, in particular at least 3 m. Conventional display techniques/electronic visual display techniques can be used as the display technique. However, in a particularly preferred design, provision can also be made for the image to be projected onto a preferably spatial projection area of the display apparatus via a beamer (in particular a VR beamer with a 180 degrees viewing angle) of the display apparatus. In this case, the projection area itself may be formed merely by, for example, a spatial wall or a projection screen. In this context, "spatial" means that the surface normals deviate from a uniform direction in the convergent direction and, in particular, are directed at a common center of the display apparatus, and preferably merge continuously into one another.

The common center can be the (VR) beamer/light projector or its beam output. Preference is given to embodiments in which the image projected onto the display is created by only exactly one single light projector, further preferably by way of a single lens, for instance a wide-angle lens. The imaging control unit used to this end controls the imaging optical unit, preferably a transilluminated display. The light source of the projector preferably has 2500 lumens or more, further preferably at least 3000 lumens, in particular at least 3500 lumens.

In a preferred embodiment, the spatial extent of the display area on which the recorded image imaging the solid angle region is projected is such that the light propagation distance to the display area, using the distance of the light projector from the center of the display area as a starting point, initially increases near the center and then reduces again away from the center along a first direction of extent with a direction running predominantly orthogonal to the vertical, and/or the light propagation distance to the display area, using the distance of the light projector from the center of the display area as a starting point, initially increases near the center and then reduces again away from the center along a second direction of extent with a direction running predominantly orthogonal to the horizontal. This reinforces the impression of the observer of the display of being located at the first location. The distance should preferably be at least 2 m, further preferably at least 3 m.

The spatial property of the display (area) is given both in the horizontal direction (azimuthal, φ) and in the vertical direction (polar, ϑ). The display area may contain plane areas but also contain curved regions, especially predominantly or in full. In the case of curved areas, a curvature (or mean curvature) that is more pronounced in the polar direction than in the azimuthal direction, preferably by at least 8%, further preferably by at least 12%, and in particular by at least 16%, is preferred. However, the display area could also have a spherical design overall.

Even if 4π spatial image data are available, it is preferable for no more than 350°, in particular no more than 340°, to be displayed simultaneously in the horizontal direction in order to create a reference point in space for the observer at the second location, for example if VR beamer technology is used. These approximately 340° or more then displayed simultaneously in the horizontal direction represent a preferred embodiment; variants in which less, but at least 150°, preferably at least 210°, and further preferably at least 270°, is displayed are also considered. A maximal angle range of 170°, preferably 160°, is provided in the vertical direction. These approximately 160° or more then displayed simultaneously in the vertical direction represent a preferred embodiment; variants in which less, but at least 70°, preferably at least 100°, and further preferably at least 130°, is displayed are also considered. The image angle regions cut out in order to form the reference point may also be only a few degrees, for instance no more than two, four or seven degrees, horizontally and/or vertically.

A zoom function is preferably provided by way of a beamer control; in it, the projected image is geared to a smaller solid angle region, optionally with appropriate magnification. The viewing direction for the observer is likewise changeably adjustable by panning the projected image. These functions are preferably realized in combination. This allows the observer at the second location to substantially adopt the viewing angle of a selected observer/observer position at the first location. Consequently, it is possible to display a selectable portion of the digitally available space, in particular 4π space, which in particular can migrate in space, for instance by panning. The imaging control unit is preferably also provided with a calibration function, by means of which the projected images are adapted to this display by means of information about geometric/shape properties of this spatial display (area) provided to the control unit. The calibration function can project calibration projections, in particular including calibration dots and/or calibration lines that appear on the display. The latter can be aligned with the shape properties of the display, for example edges or corners, by displacement or can be placed in correspondence, and thus set the calibration. This can realize an image of the spatial data on the spatial display that has fewer distortions where possible.

As mentioned previously, a wall can form the display area. The display area then preferably also extends (this wall being referred to below as front wall) onto one adjacent side wall, particularly preferably both adjacent side walls. Further preferably, the display area then also extends onto the adjacent ceiling and particularly preferably also onto the adjacent floor. The side walls could be fixed walls or separately set up partitions.

In a further preferred design, one or more electronic visual displays, for instance in the form of computer terminals and/or tablets, are also provided at the second location. In a preferred embodiment, the corresponding control comprises the full overall image data In a possible embodiment, the overall image can be displayed in full or virtually in full on the electronic visual display, with a corresponding compression in the vertical and/or horizontal direction, within the meaning that the viewing angle range of the observer in respect of the respective angle is a smaller angle than that of the horizontal or vertical angle range of the overall image data. In a possible embodiment, a corresponding compression factor is greater than 1.2, preferably greater than 1.4, and in particular greater than 1.6. The functions (zooming, panning) with regard to display control explained above on the basis of the VR beamer may likewise be present on the electronic visual displays. In a preferred embodiment there are at least 2 electronic visual displays present, displayed on which are images, recorded at the same time, from different viewing angles and/or different solid angle regions of the available overall space.

Moreover, as also already explained, provision is preferably made for the at least one electronic visual display to have a zoom function in order to allow individual portions of the overall image to be displayed with magnification. In another mode of operation, the controller is likewise designed to allow the portion of the overall image to migrate in the full overall image, in accordance with a change in the viewing angle using the center as a starting point. For example, the portion could correspond to the normal visual field of a person at the second location, as if they were at the first location. In particular, regular/angular parameters can be used within the scope of the image provision.

In a preferred embodiment, access to the overall image data at the second location and/or optionally at further locations is restricted and requires clearance and/or authorization in advance. Access rights could be granted from the first location, from the second location, and/or from a third location. In any case, a freely accessible transmission over free networks, the Internet or public networks within the scope of the transmission and display in real time is preferably precluded, with the result that only a restricted group of people have access.

In a possible embodiment, a monitoring device with automated image recognition, in particular assisted by artificial intelligence, is provided at the second location, and/or an AI with an assigned scope of functions. Such a monitoring apparatus could be advantageously used as an assistance system, especially if the overall image images the location of a hazardous situation, for example in the case of fires, following earthquakes, in the case of flooding or other natural disasters, or else in other situations in which for example rescue workers, firefighters and/or civil protection workers are deployed. In this case, the second location can be a mobile command center in particular.

In this context, the invention also provides a safety system for use in hazardous situations, comprising a communications system according to any of the aforementioned aspects, wherein the first location is the location of the hazard in the hazardous situation, the second location for example is a command center, and at least one piece of equipment and/or one vehicle of the safety system is positioned at the first location, together with or in addition to the components of the communications system associated with the first location. The walls forming the display area (front wall, side walls, ceiling, floor) could be interior walls of a container (module) set up in the vicinity of the hazardous zone. Initially, there might not yet be any possibility of transmission at the location of the hazard. The invention therefore provides for the targeted creation of the network structure at the first location. This preferably includes the setting up of a local network covering the first location, for instance LTE, including a satellite link. To this end, this exemplary embodiment preferably also otherwise resorts to MEO and/or LEO satellites and digital transmission technology in respect of SAT-including transmission paths, and not to the known analog TV/broadcast satellite network. With regard to the frequency range, the E-band is preferably considered, or even shorter wavelengths.

Moreover, the invention also relates to a learning and/or training system, comprising a communications system according to any of the aforementioned aspects, wherein the second location is a teaching and/or training location and the first location, at which the constituent parts of the communications apparatus associated with the first location are positioned, is a location containing learning and/or training objects or at which learning and/or training actions are performed. In this respect, the second location may also be decentralized, within the meaning that a plurality of additional further locations at which the spatial data are likewise provided are envisaged in addition to the second location.

In addition to learning and/or teaching purposes, entertainment purposes such as for instance game shows, contests, or comparable applications may also resort to the communications system according to the invention, especially if these also include feeds from remote locations (the remote location in this case corresponds to the first location) at a main recording location and/or a spatial atmosphere is otherwise presented. In this respect, the invention also relates to entertainment systems from an application point of view.

In a particularly preferred design, the camera lenses are, according to the invention, at a distance of no more than 40 cm, further preferably no more than 35 cm, and in particular no more than 30 cm from the common center. However, consideration is preferably also given to embodiments in which the cameras are at a distance of no more than 25 cm, in particular no more than 22 cm, and even no more than 18 cm from the common center. This yields a good compromise between satisfactory image quality and physical optics.

In a further embodiment, the communications system comprises a storage device for data storage. However, in a particularly preferred embodiment, the data memory is not used to buffer store the generated frame data and/or overall image data stitched therefrom, prior to the transmission thereof, and is preferably likewise not used to buffer store the overall image data prior to the display thereof at the second location, but preferably only for the storage thereof following the display thereof at the second location. In this way, archive material can be provided for the purposes of an analysis at a later date. In this context, provision is also made, in particular, for the aforementioned buffer storage prior to the transmission or prior to the display of the overall image data not to be implemented at all. Preferably, recording, synthesis, transmission, and display of the images (image data) is implemented in a flow/stream.

BRIEF DESCRIPTION OF THE DRAWING

Further features, details and advantages of the invention emerge from the following description with reference to the attached figures, in which FIG. 1A schematically shows a location of a hazard, at which a part of a safety system is used, FIG. 1B schematically shows another location, at which another part of the safety system is used.

DETAILED DESCRIPTION OF THE INVENTION

Figure 1A:
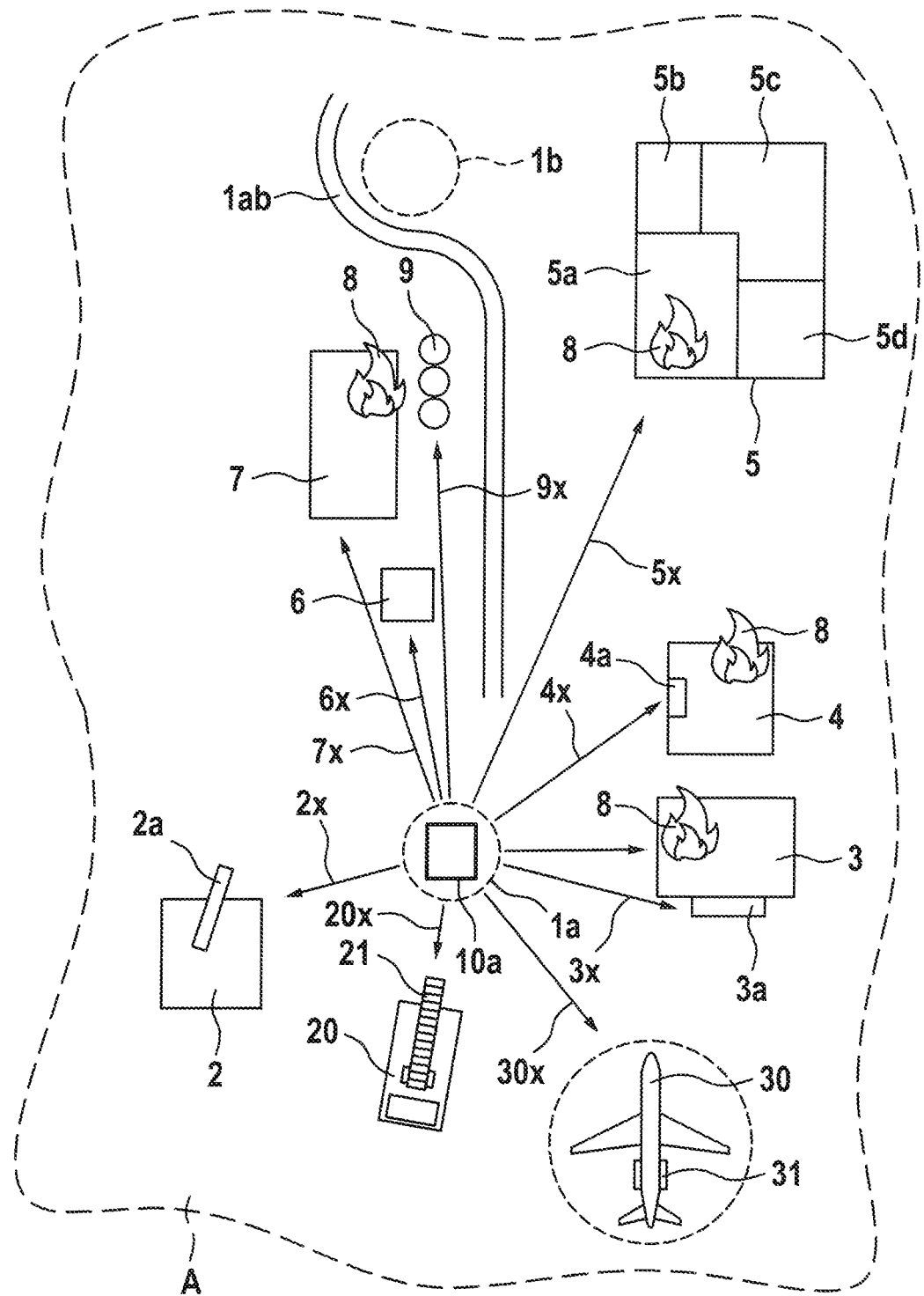

The schematic illustration of FIG. 1A depicts a location of a hazard A, where a hazardous situation is prevalent, present in this exemplary case in the form of a major fire, for example on a relatively large industrial site housing chemical industry. It is self-evident that the exemplary illustrations are simplified and may deviate from the complex reality of the actual hazardous situation for illustrative purposes.

Figure 2:
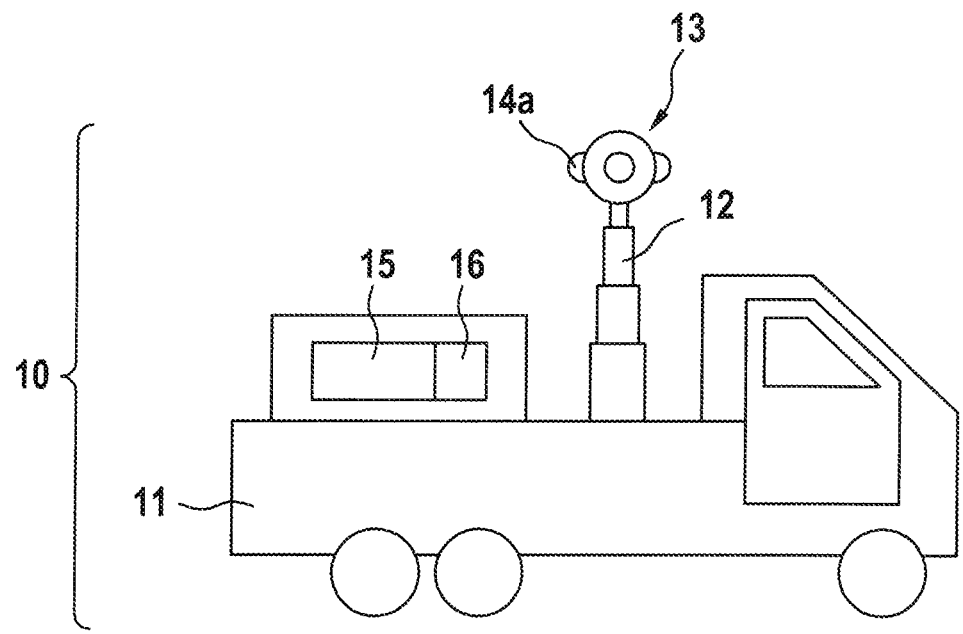
FIG. 2 shows a mobile image recording and transmission unit.

FIG. 1A depicts a plurality of buildings 2, 3, 4, 5, 6, 7, some of which are in flames; this is expressed by a fire symbol 8. The emergency personnel have successfully positioned a mobile unit 10a as far forward as point 1a at the location of the hazard A. In the specific example, the mobile unit 10a is the vehicle 11 which is depicted in FIG. 2 and which is equipped with an image recording apparatus 13 and a data transmission apparatus 15 and also an image synthesis apparatus 16, which will be explained in more detail hereinafter with reference to FIG. 2. Especially in the case of danger to life and limb at the point 1a, this could however also be an autonomously controlled vehicle in the conventional sense or a robot, or else a unit without a dedicated propulsion means that has been placed there.

From the deployment point 1a, the image recording apparatus 13 of the mobile unit 10 has covered a solid angle region extending over 360° in a horizontal angle range (the plane of the paper of FIG. 1A in polar coordinates) on account of the plurality of cameras 14a, 14b, 14c, 14d with the common center Z. Consequently, the field of view of the image recording apparatus 13 contains not only the buildings 2, 3, 4, 5, 6 and 7, indicated by viewing direction arrows 2x, 3x, 4x, 5x, 6x and 7x in FIG. 1A, but also the further surroundings, in particular the forward field of view, which is symbolized by arrow 9x approximately in the direction of a suitable deployment location 1b located further back, to which the mobile unit 10a intends to advance at a later time, or else at which a second, for example identical mobile unit 10b (not illustrated) could be positioned.

Additionally, one of the cameras 14i, with a downward viewing direction in FIG. 1A, observes the region behind the mobile unit 10a, as indicated by the arrow 20x, and a south-easterly direction with respect to the plane of the paper of FIG. 1A, as indicated by the arrow 30x.

The frame data recorded by the individual cameras 14a, 14b, 14c and 14d, which are designed as digital cameras, are stitched directly in situ to form overall image data by the synthesis apparatus 16 (FIG. 2) of the mobile unit 10, the overall image data comprising the full 360° in the azimuthal direction in this exemplary embodiment and also comprising the full 180° in the vertical range in this exemplary embodiment, with a smaller range of for example 90°, 65° of which are distributed above the horizontal and 25° below, also being possible in principle. It is understood that a different range could be imaged in relation to the horizontal angle range as well. The full solid angle region of 4π is covered in the example, and there can subsequently be navigation in this entire space at this location or other locations.

Figure 1B:
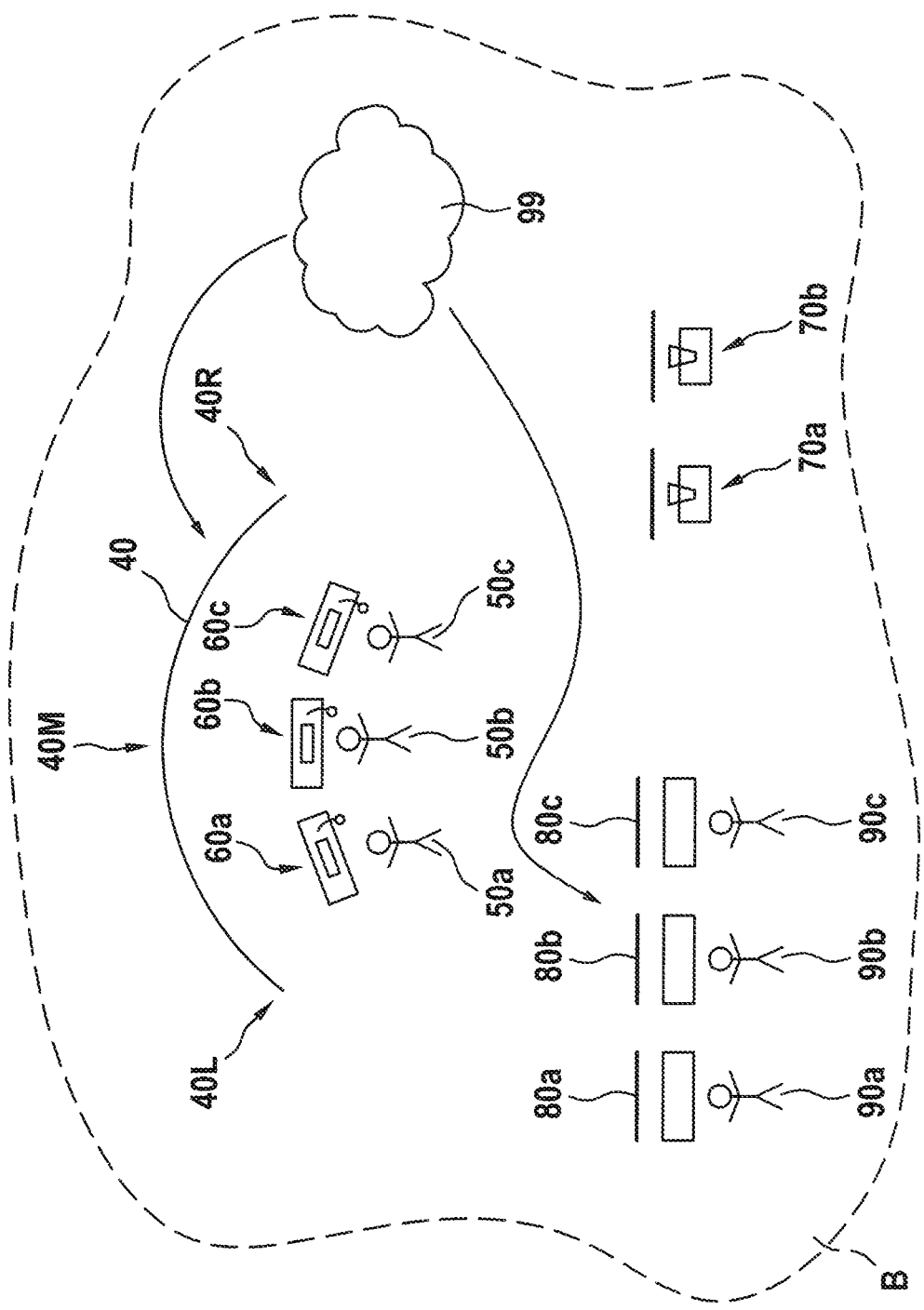

The overall image data which are formed by the synthesis apparatus 16 and acquired directly following the generation of the frame data are now transmitted in real time to location B depicted in FIG. 1B, for example a command center of the emergency personnel. Accordingly, location B could be a location also situated a very long way away from deployment location A; however, the command center could for example also be a mobile command center and be located at a distance from the deployment location A that still includes a sufficient safety margin.

To this end, the data transmission apparatus 15 monitors the data transmission capacities recurrently, in particular continuously, on different selectable transmission channels such as for example LTE, SAT, WLAN, LAN and automatically chooses a transmission channel or a plurality of parallel transmission paths, according to specified criteria and/or under AI control for example, the said channel or channels representing the most reliable transmission path(s) for the time interval following the instant and having sufficient data transmission capacities. A parameter used during the selection may also be the transmission time required for the transmission to location B; shorter transmission times are preferred in the case of similar preconditions. The transmission quality is also monitored continuously during the data transmission, and the data transmission apparatus is controlled to switch to one or more other transmission channel or channels if the transmission quality drops below a specified level.

In this way, an overall image which corresponds to the overall image data and which is in the form of a digital space is available at reception location B, which comprises a control system provided with reference sign 99 in FIG. 1B, the said overall image being able to be reproduced and being reproduced, for example at least in an azimuthally compressed form, on a spatial display area 40 by means of VR light projection technology.

By way of example, the left image edge 40L of the spatial display 40 displays the backward azimuthal viewing direction (approximately arrow 20x) according to the recording situation (FIG. 1A), the center of the image region 40M displays the azimuthal region directed forward in FIG. 1A (approximately the region between arrows 7x and 5x), up to the edge region 40R, which once again depicts the region adjoining the region 40L in the backward direction of FIG. 1A, wherein an overlap region of for example 20° is depicted for the purpose of avoiding a sharp transition edge, with the result that, overall, a 340° recording of the entire azimuthal angle range at the location of the hazard A is available in real time on the large electronic visual display 40. As already mentioned above, it is not the full 360° but only 360°−x that are displayed in order to avoid difficulties with orientation; x is approx. 20° here.

Visually, operators 50a, 50b and 50c (FIG. 1B) at respective consoles 60a, 60b, 60c thus are provided with the overall image or an overall impression of the happenings at the location of the hazard A without themselves being situated at the location of the hazard A, this overall image or overall impression being of the space as it appears in an all-round view to the emergency personnel in situ. In the specific exemplary case, the image is presented on the display 40 by way of a projector (not shown); however, the display could also be formed by one or more active large electronic visual display(s) using known technology.

The persons 50a, 50b and 50c can subsequently coordinate the deployment at the location of the hazard A. By way of example, they can mark regions on the display 40 by way of their respective console, for example by superimpositions, for instance in the form of a flashing boundary. In this respect, they are assisted for example by analysis units 70a, 70b, where changes in the image capture region are recognized by way of automatic image recognition, which comprises evaluation programs also in the form of artificial intelligence, or where potential hazardous situations are recognized by way of image comparison/matching and/or image analysis.

For the hazardous situation depicted in FIG. 1A, the following moments, in particular potential hazards, are recognized for instance:

By way of viewing direction arrow 20x and an estimate of the distance, it is recognized that a rescue vehicle 20 (depicted with rescue ladder 21 in FIG. 1A) has already arrived at the location of the hazard A, and so it is ready for deployment. By way of viewing direction 5x, it is recognized that the flames have already spread to building part 5a, but building parts 5b, 5c, 5d appear to be still rescuable from the flames. Moreover, a comparison of information yields the information that chemicals are stored in building part 5c and the release thereof as a result of flames spreading to this building part is to be feared.

Moreover, it is recognized that persons have congregated on a balcony 3a of building 3, but the flames 8 on building 3 have only spread to the side of the building distant from the balcony 3a. Also, by identifying movement in viewing direction 4x, it is determined that persons are probably still lingering behind a window 4a of the building 8 which is likewise already in flames.

In this situation, the coordinators 50a, 50b and 50c for example initially assign respective areas of responsibility to one another. Moreover, by way of individual electronic visual displays 80a, 80b, 80c, for instance in the form of tablets, individual observers 90a, 90b, 90c can be tasked with monitoring individual solid angle portions; for example, individual observer 90b receives the task of monitoring the azimuthal range located between the observation arrows 6x and 5x in FIG. 1A.

For example, in this situation, emergency vehicle 20 could receive the mission command of advancing along connection path 1ab in the direction of building 5, and/or a further mobile emergency vehicle 10b (not depicted here), which has a similar design to the mobile unit 10a, could receive the task of advancing to deployment point 1b.

Now individual observer 90b, on their own or optionally assisted by the evaluation units 70a or 70b, recognizes that, in viewing direction 9x, hazardous material containers 9 with explosive material are located in a region exposed to flames 8 from building 7, and an explosion of the containers 9 is to be feared. On account of the real-time transmission, the command center at the location B can still pass on a timely warning to the emergency vehicle 20 closing in on the hazardous containers 9. The command center at the command center location B, which is remote from the location of the hazard A, can consequently respond in real time, not only in view of this one viewing direction, but also in the other viewing directions of up to 360°.

An acoustic warning and stop signal would be sent to the emergency vehicle 20 in the specific case. In other conceivable situations, in which the hazardous nature of the containers 9 is not readily obvious but appears possible, an image portion, for example the image portion available to the individual observer 90b on electronic visual display 80b, could be retrieved following appropriate feedback information on an electronic visual display in the emergency vehicle 20 and the potential hazardous location could be marked, whereupon the further action is left to the discretion of the emergency personnel in the emergency vehicle 20 in situ.

In the present case, the command center at location B, by chance provided at the same time with the information that a firefighting plane 30 with water containers 31 is already approaching (already plotted in the south-east corner of FIG. 1A, but not at the real distance) by way of backward skyward viewing angle 30x, would direct the firefighting plane 30 to drop water on building part 5a or building 5, whereas the emergency vehicle 20 receives a callback command and a new mission command of saving the persons behind window 4a in building 4 or on balcony 3a of building 3, depending on the detailed assessment of for example the individual observer 90c, who keeps these buildings 3 and 4 in a corresponding solid angle portion in their visual field.

In the meantime, individual observer 90a has for example verified that building 6 requires neither rescue measures nor security measures, and subsequently checks building 2 with a viewing direction to the west (arrow 2x). What is recognized here, possibly with assistance by the image evaluation and analysis units 70, is that access to building 2 for verification purposes is prohibited as there is a risk of collapse on account of the damage by the flames; this is symbolized by an angled roof beam 2a in FIG. 1A.

As presented for a specific individual case on the basis of this exemplary embodiment, the real-time capable bidirectional communications system according to the invention forms an essential constituent of a safety system for countering hazardous situations.

It is self-evident that the use of such a safety system is not restricted to deployments in the case of major fires. By way of example, hazards or disaster situations may also be present in other contexts. For instance, in the case of an earthquake, the system could be used at locations affected by earthquakes, with hazardous situations in view of buildings at risk of collapse and rescue situations in view of rescuing buried victims. Likewise, deployments in the case of flooding are conceivable, in which case the mobile image recording and transmission unit can be arranged on a boat, and, in cases where an approach of a deployment location on water or on land is made difficult or impossible, the coupling of the mobile image recording and transmission unit to an aircraft in the air, for instance a helicopter, is also considered. In this case, the captured vertical angle range would comprise $\pi$ and would no longer necessarily comprise the horizontal ($\pi/2$).

Frame data streams from the individual cameras 14a to 14d of the image recording apparatus 13 are supplied to the synthesis apparatus 16 in synchronized fashion and the synthesis apparatus uses these to create overall image data. In this respect, the synthesis apparatus resorts to the frame data for solid angle regions covered by only one of the cameras 14i and uses respective component frame data with the formation of defined transition regions for solid angle regions in which frame data from at least two cameras 14i,j are available in order to create overall image partial data covering this solid angle region therefrom. To improve the real-time transmission, there is no interim storage prior to the transmission; the frame data are in fact stitched together in the flow and the overall image data are transmitted in the flow to the other location B via the data transmission apparatus 15, for example by means of LTE. A satellite link is also used additionally in the case of an insufficient bandwidth.

Thus, as already explained in detail above, a transmission path appearing most promising for a stable data transmission in real-time, optionally also a plurality of channels in parallel, is selected for the transmission. This is implemented with verification of achievable data transmission rates and optionally an outage resistance of the transmission path. In the specific exemplary embodiment, the data transmission is implemented at a transmission rate of at least 40 Mbit/s.

Figure 3:
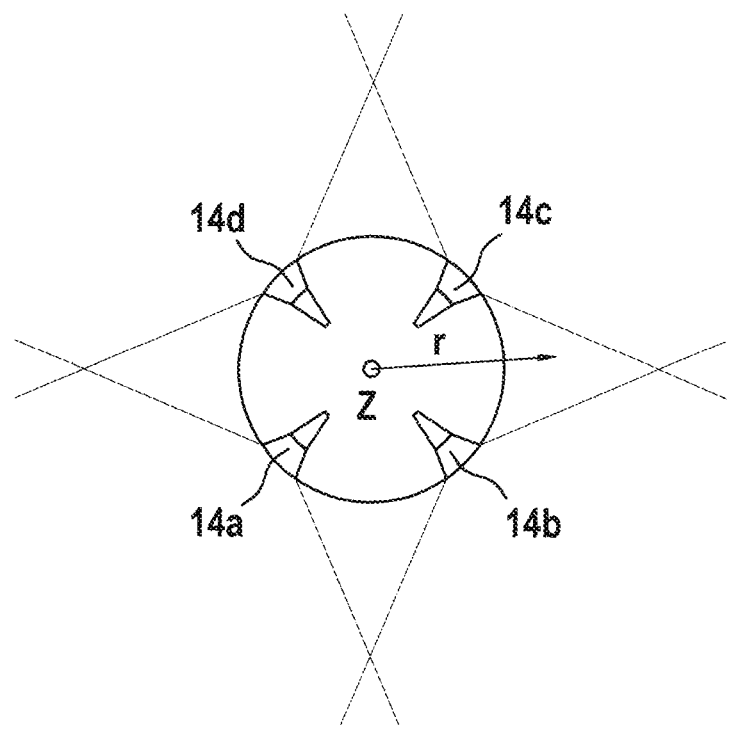
FIG. 3 shows cameras of the image recording unit and their common center.

The image recording apparatus 13 depicted in FIG. 2 comprises four cameras in a local equatorial plane in this exemplary embodiment, with a common center Z as depicted in FIG. 3. It is self-evident that a different number of cameras could also be used; however, at least two cameras, then diametrically opposite one another, are required according to the invention. For example, six-camera systems or eight-camera systems could also be used.

The command center described with reference to FIG. 1B could itself also be mobile, in particular be available ready for setup in one or more vehicles, for example trucks. Combinations of one fixed and at least one mobile command center are also conceivable, whereupon the data transmission from the data transmission apparatus 15 could be implemented both to the mobile command center and to the fixed command center.

Figure 4A:
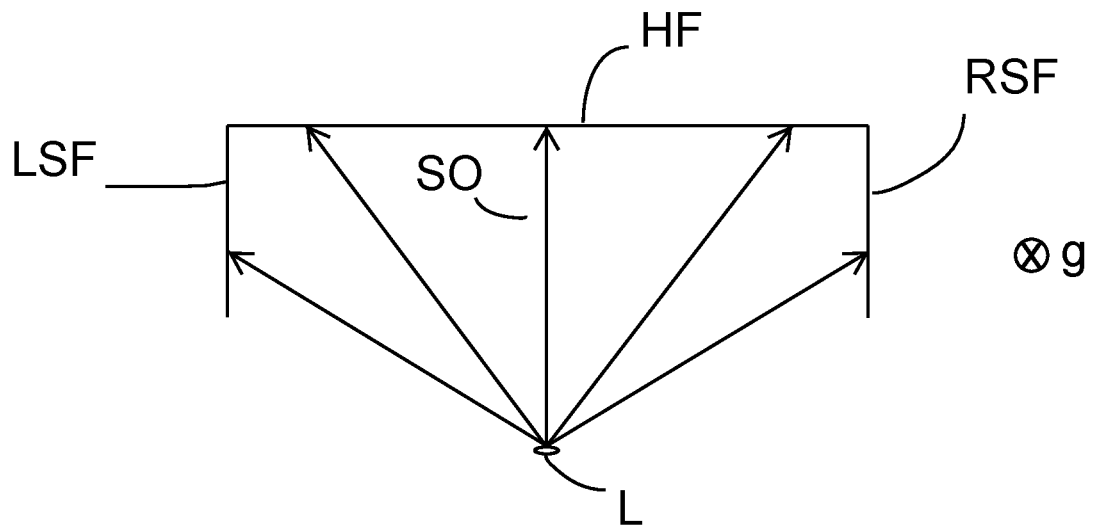
FIG. 4A shows a spatial display area in an opened up view from above.
Figure 4B:
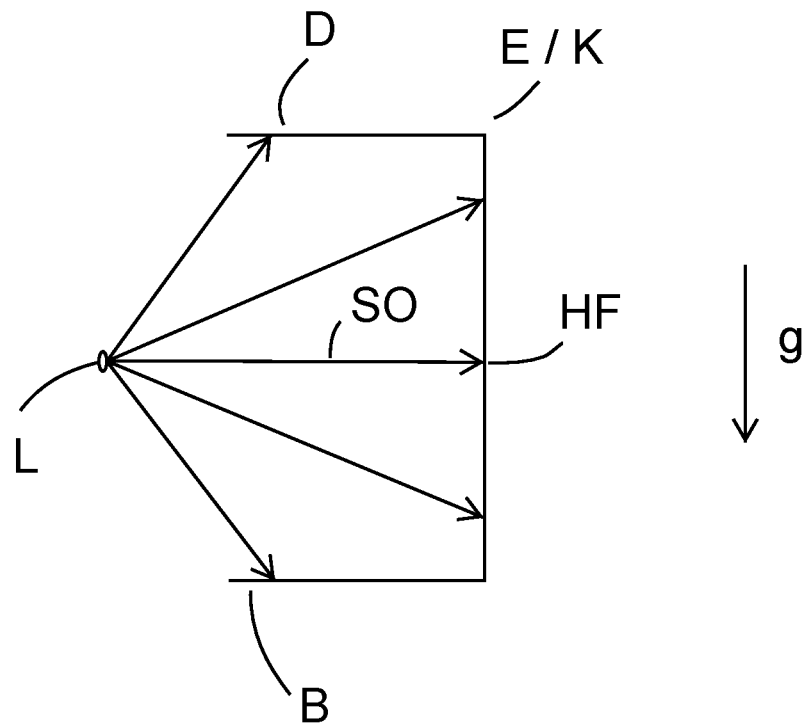
FIG. 4B shows this display area in an opened up view from the side.

A further exemplary embodiment of a spatial display area is formed in FIGS. 4A, 4B. It is composed of a main area HF (frontal wall), a right side area RSF, a left side area LSF, which for example can be internal walls (or portions of same) of a room in the building, for instance also in a container, and also of adjacent regions of the floor B and the ceiling D. This ceiling/floor can be formed by the ceiling of the room and the floor in the building/container (painted or coated bright/white), or else by taken-down areas/plinth structures. The side areas could also be partitions or lateral screens. The light projector (only the lens L of which is depicted) is preferably arranged centrally at a distance from the main area, which substantially corresponds to the light propagation path of a central light ray S0. The above-described first direction of extent could be approximately the profile (LSF, HF, RSF) of the display area in the plane depicted in FIG. 4A (horizontal plane); the second direction of extent could be the profile (B, HF, D) of the display area in the plane depicted in FIG. 4B (vertical plane orthogonal to the vector product of g and S0). By way of example, the projector could also be set up further away or closer than what is depicted in FIG. 4. Then, the image representation would be adapted to the new conditions by the imaging control unit by way of a recalibration, for instance a readjustment of the calibration lines and corners to the edges K between the wall regions and the corners E of the display area.

The data transmission can be implemented on secured channels and/or in encrypted form. In any case, protection mechanisms which restrict access options are provided. Expressed positively, access rights only exist if granted by an access assignment device. Access rights can be granted in part, both in space and time, but can also be withdrawn again.

The recorded frame data and/or the overall image data can also be stored. However, storage is preferably only implemented following the implemented transmission from the first location to the second location and the reproduction at the second location.

Return transmissions or data transmissions from the second location back to the first location are also provided and can be recorded, but preferably also only after an implemented return transmission and in particular also after reproduction.

To ensure a transmission of the real-time transmission with a time delay that is reduced to the greatest possible extent, especially in the case of live applications, a sufficient bandwidth of the transmission is ensured by way of the transmission channel selection option, while the synthesis apparatus creates the overall image data on the basis of the available bandwidth in particular, and in sufficiently short time.

Other use options for the in particular bidirectional communications system according to the invention are also conceivable, for example in the form of training and/or teaching systems.

Thus, it is conceivable that the real hazardous situation presented in detail above on the basis of FIG. 1A is only simulated, for example in a training area. The first location would then be a training area, for example. The transmission from the data transmission apparatus 15 could then be directed at a teaching center, which can be designed the same as or similar to the command center described in FIG. 1B.

Thus, the teaching center preferably also has a display on which a 340° portion of the overall image, which is available over 360° in the azimuthal direction, is displayable. Moreover, individual terminals are considered, on which a solid angle portion of adjustable size, up to virtually the entire solid angle region or the entire solid angle region of the transmitted overall image data, is selectable by way of a zoom function. To this end, the overall image data have been stored to be available, with the result that even if only one partial image region is displayed, the image depicted on the electronic visual display can pan from one region to a next region by carrying out a viewing angle change function, to simulate a viewing direction change or to correspond to a twisting of the head of the user, for example by way of a panned representation of the displayed partial image. Such methods of representations are known per se, for example from the computer games industry, and corresponding techniques can be used, with the overall image data not reflecting virtual reality but real images transmitted in real time. Hence, the observer viewing the electronic visual display has options for accessing the overall image (up to the entire space at the first location).

In this context, it is also conceivable that, at the second location, for instance a teaching center, overall image data are not only transmitted from the first location in real-time; instead, the image representation at the second location, especially on the overall display, is intermittently also fed from other image data sources, for example also from other locations such as for instance a third or a fourth location, preferably likewise from image recording and data transmission devices with correspondingly large solid angle regions as explained above, which are positioned there.

At the second location, there can be communication from the second location back to the first location, once again by way of the bidirectional communication in a manner similar to what was explained with regard to the first exemplary embodiment. This communication can relate to the currently depicted overall image data (or the corresponding overall image data portion) in real time and be available in the form of a query or feedback. Unlike in the representation of a specific hazardous situation explained above, the feedback from the second location to the first location is consequently less in the form of alerts or mission commands, and more in the form of requests for additional information formed on the basis of the overall image data. By way of a feedback control, this could also lead to a modification of the overall image data as transmitted, and to a change and/or introduction of additional supplementary data provided in synchronous and simultaneous fashion with the overall image data, and/or to the provision of further data from the first location. The supplementary data and/or further data made available from the first location can be implemented in the form of modified image data, additional image data, for instance in the form of an overlay, or else in the form of audio data.

In a modification of this second exemplary embodiment, provision is also made for the overall image data available at the second location on account of the transmission from the first location to be forwarded to decentralized branch locations of the second location or to be sent to these directly from the first location. Thus, the teaching and/or training system can also be used in decentralized fashion if a presence of the participant at the second location itself is not possible or not desirable. Appropriate access right control is implemented in this case, preferably from the first location and/or from the second location.

What can likewise be considered in a further exemplary embodiment is that a central second location, in particular a large-area display and/or a projection by means of VR beamers, is no longer used in that case; instead, use is only made of decentralized receiver locations 2, at which the overall image data are available in real time and there is the option for response, preferably likewise in real time as well. The access right controls for the transmitted overall image data may differ from the clearance controls for the communication back to the first location.

The invention claimed is:

1. A communications system, comprising:
    an image recording apparatus configured to record images at a first location and to generate image data therefrom, the image recording apparatus including at least two cameras;
    a data transmission apparatus configured to transmit the generated image data from the first location via at least one transmission path to a second location remote from the first location;
    a first receiver apparatus configured to receive the transmitted image data at the second location;
    an image synthesis apparatus, wherein the at least one transmission path is a transmission path selected from a plurality of selectable transmission paths and the image data present at the second location are overall image data, which are transmitted to the second location in real time, stitched in synchronized fashion by the image synthesis apparatus from at least two frame data generated simultaneously by in each case one of the at least two cameras of the image recording apparatus, and represent and image of a solid angle region spanned with respect to a common center of the at least two cameras that generate the frame data by a horizontal angle range, related to a direction of gravity, of at least $7\pi/6$ and a vertical angle range, comprising the horizontal, of at least $\pi/3$, with the radially outermost lens of the respective camera having a distance from the common center of no more than 40 cm;
    a sensing device for sensing the current and/or currently achievable transmission rates; and
    a switch-over device configured to switchover between a first mode of operation of continuous image data transmission and a second mode of operation with discontinuous image data with an adjustable time interval.

2. The communications system according to claim 1, wherein the image synthesis apparatus is interposed between the image recording apparatus and the data transmission apparatus, wherein the transmitted data are the overall image data.

3. The communications system according to claim 1, further comprising a second receiver apparatus provided to receive a feedback signal at the first location, the feedback signal being a signal that has arisen based on at least one partial image from the transmitted overall image data and being a signal sent in real time.

4. The communications system according to claim 1, wherein the plurality of selectable transmission paths comprise at least two from the group consisting of: LTE, SAT, WLAN, LAN, and landline.

5. The communications apparatus according to claim 1, wherein the image recording apparatus is a mobile device whose position is changeable during ongoing operation.

6. The communications system according to claim 1, wherein a transmission rate of the image data, in particular of the overall image data, is at least 5 Mbit/s.

7. The communications system according to claim 6, wherein the transmission rate of the image data is at least 10 Mbit/s.

8. The communications system according to claim 7, wherein the transmission rate of the image data is at least 20 Mbit/s.

9. The communications apparatus according to claim 1, wherein the communications apparatus is capable of live transmissions and/or pre-live transmissions.

10. The communications system according to claim 1, further comprising a projector for displaying, on a display area, at least a partial image of an overall space spanned by the overall image data.

11. The communications apparatus according to claim 10, comprising VR projection technology and a spatial display area.

12. The communications system according to claim 1, further comprising at least one small electronic visual display on which at least a partial image of the overall image corresponding to the overall image data is displayable.

13. The communication system according to claim 12, wherein the at least one small electronic visual display is a tablet.

14. The communications system according to claim 1, comprising an image portion selection function, a zoom function, and/or a viewing angle change option for the representations displayed at the second location.

15. The communications system according to claim 1, comprising a control of the image synthesis apparatus based on the transmission rates signaled by the sensing device.

16. The communications system according to claim 1, wherein the switch-over device is controlled based on the transmission rates signaled by the sensing device, at least in one mode of operation.

* * * * *